United States Patent
Wang et al.

(10) Patent No.: US 11,705,840 B2
(45) Date of Patent: Jul. 18, 2023

(54) COMMUTATION ERROR COMPENSATION METHOD AND APPARATUS FOR ELECTRIC MOTOR, AND STORAGE MEDIUM

(71) Applicants: Guangdong Midea White Home Appliance Technology Innovation Center Co., Ltd., Foshan (CN); Midea Group Co., Ltd., Foshan (CN)

(72) Inventors: Lu Wang, Foshan (CN); Ziqiang Zhu, Foshan (CN); Hong Bin, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/718,171

(22) Filed: Apr. 11, 2022

(65) Prior Publication Data
US 2022/0239243 A1    Jul. 28, 2022

Related U.S. Application Data

(63) Continuation of application No. PCT/CN2019/118185, filed on Nov. 13, 2019.

(51) Int. Cl.
*H02P 21/09* (2016.01)
*H02P 21/18* (2016.01)
*H02P 21/13* (2006.01)

(52) U.S. Cl.
CPC .............. *H02P 21/09* (2016.02); *H02P 21/13* (2013.01); *H02P 21/18* (2016.02); *H02P 2207/05* (2013.01)

(58) Field of Classification Search
CPC .......... H02P 21/09; H02P 21/13; H02P 21/18; H02P 2207/05; H02P 6/18; H02P 23/12;
(Continued)

(56) References Cited

U.S. PATENT DOCUMENTS

| 7,777,436 | B2 * | 8/2010 | Brown ..................... H02P 6/182 |
| | | | 318/400.14 |
| 2003/0025475 | A1 | 2/2003 | Won et al. |

(Continued)

FOREIGN PATENT DOCUMENTS

| CN | 102437805 A | 5/2012 |
| CN | 104995833 A | 10/2015 |

(Continued)

OTHER PUBLICATIONS

Midea Group Co., Ltd., Extended European Search Report and Supplementary Search Report, EP19952779.7, dated Sep. 26, 2022, 6 pgs.

(Continued)

*Primary Examiner* — David Luo
(74) *Attorney, Agent, or Firm* — Morgan, Lewis & Bockius LLP

(57) ABSTRACT

A commutation error compensation method for an electric motor includes: when a rotor, that has not been corrected, in an electric motor rotates in a set direction, collecting a position signal and a three-phase current signal of the rotor, wherein the position signal of the rotor represents the rotation angle of the rotor; filtering processing on the three-phase current signal to obtain a fundamental component of the three-phase current signal, and determining a position error compensation signal of the electric motor on the basis of the fundamental component of the three-phase current signal; determining an ideal phase interval of the rotor according to the position error compensation signal (Continued)

and the position signal of the rotor; and determining an adjustment method for the rotor of the electric motor according to the ideal phase interval of the rotor, and commutating the rotor of the electric motor according to the adjustment method.

9 Claims, 12 Drawing Sheets

(58) Field of Classification Search
CPC ........ H02P 2203/05; H02P 6/12; H02P 23/14; H02P 29/028
USPC .............................. 318/400.02, 400.01, 700
See application file for complete search history.

(56) References Cited

U.S. PATENT DOCUMENTS

| | | | |
|---|---|---|---|
| 2014/0225548 | A1 | 8/2014 | Xu et al. |
| 2016/0359442 | A1 | 12/2016 | Zhao et al. |

FOREIGN PATENT DOCUMENTS

| | | | |
|---|---|---|---|
| CN | 106059409 | A | 10/2016 |
| CN | 106160609 | A | 11/2016 |
| CN | 106374789 | A | 2/2017 |
| CN | 108696225 | A | 10/2018 |
| CN | 108702117 | A | 10/2018 |
| CN | 108809161 | A | 11/2018 |
| CN | 108900131 | A | 11/2018 |
| CN | 109039171 | A | 12/2018 |
| EP | 3040690 | A1 | 7/2016 |
| JP | 2015109792 | A | 6/2015 |
| JP | 2015223023 | A | 12/2015 |

OTHER PUBLICATIONS

Midea Group Co., Ltd., IPRP, PCT/CN2019/118185, May 17, 2022, 4 pgs.
Midea Group Co., Ltd., Written Opinion, PCT/CN2019/118185, dated Jul. 24, 2020, 3 pgs.
International Search Report, PCT/CN2019/118185, dated Jul. 24, 2020, 6 pgs.
Midea Group Co., Ltd., Chinese Office Action, CN Patent Application No. 201980094561.3, dated Apr. 10, 2023, 10 pgs.
Midea Group Co., Ltd., Japanese Notice of Allowance, JP Patent Application No. 2022-513978, dated Mar. 22, 2023, 5 pgs.

* cited by examiner

| Position signal of rotor | 30°～90° | 90°～150° | 150°～210° | 210°～270° | 270°～330° | 330°～30° |
|---|---|---|---|---|---|---|
| Sector | I | II | III | IV | V | VI |
| Drive scheme | A+B- | A+C- | B+C- | B+A- | C+A- | C+B- |

FIG. 5

COMMUTATION ERROR COMPENSATION METHOD AND APPARATUS FOR ELECTRIC MOTOR, AND STORAGE MEDIUM

CROSS-REFERENCE TO RELATED APPLICATION

This application is a continuation of PCT International Application No. PCT/CN2019/118185, filed Nov. 13, 2019, the entire contents of which is incorporated herein by reference.

TECHNICAL FIELD

The disclosure relates to the technical field of control of an electric motor, and in particular to a method and apparatus for compensating a commutation error of an electric motor, and a storage medium.

BACKGROUND

Currently, a high-speed miniaturized Brushless Direct Current motor (BLDC) is more and more widely used, especially in a field of a small electric tool such as a hand-held vacuum cleaner, or the like. Due to existence of factors such as reactance of winding, a conventional drive scheme of the BLDC has commutation error, which cannot ensure commutation of the high-speed BLDC at an optimal commutation point, so that a phase current lags a corresponding back electromotive force, which brings many adverse effects to performance of the motor.

In a related art, phase error of the commutation is usually determined by a flux observer and a current integrator, and an error compensation signal is generated. However, such commutation error compensation scheme is based on the premise that resistance and inductance information of the flux observer of an electric motor is accurate, and the current integrator does not have an offset error. However, in practice, the commutation error cannot be accurately detected due to deviation occurred in a manufacturing process and a current signal offset, which makes the high-speed BLDC impossible to commutate at the optimal commutation point, affecting drive performance of the BLDC.

SUMMARY

In order to solve the problem in the related art, embodiments of the disclosure propose a method and apparatus for compensating a commutation error of an electric motor and a storage medium, which is capable of generating an ideal commutation error compensation signal to ensure commutation of the BLDC at the optimal commutation point.

Embodiments of the disclosure provide a method for compensating a commutation error of an electric motor, which includes the following operations.

A position signal and a three-phase current signal of a rotor that has not been corrected in an electric motor are collected when the rotor rotates in a set direction; here the position signal of the rotor represents a rotation angle of the rotor.

Filtering processing is carried out on the three-phase current signal to obtain a fundamental component of the three-phase current signal, and a position error compensation signal of the electric motor is determined based on the fundamental component of the three-phase current signal.

An ideal phase interval of the rotor is determined according to the position error compensation signal and the position signal of the rotor.

An adjustment scheme for the rotor of the electric motor is determined according to the ideal phase interval of the rotor, and the rotor of the electric motor is commutated according to the adjustment scheme.

In the above solution, the operation of carrying out filtering processing on the three-phase current signal to obtain the fundamental component of the three-phase current signal includes the following operations.

An angular velocity of the rotor that has not been corrected in the electric motor is obtained.

A cosine reference signal and a sine reference signal are determined according to the angular velocity.

An initial current output signal is determined based on the cosine reference signal and the sine reference signal.

A weighting signal is generated based on a difference between the three-phase current signal and the initial current output signal.

The fundamental component of the three-phase current signal is obtained according to the weighting signal, the cosine reference signal and the sine reference signal.

In the above solution, the operation of determining, based on the fundamental component of the three-phase current signal, the position error compensation signal of the electric motor includes the following operations.

The fundamental component of the three-phase current signal on a stationary coordinate system is converted into a two-phase current signal on a rotational coordinate system; here a rotation angle of the rotational coordinate system is the same as the rotation angle of the rotor of the electric motor, the two-phase current signal includes a d-axis current corresponding to one axis in the rotational coordinate system.

The d-axis current is adjusted according to a corresponding relationship between the d-axis current and the position signal of the rotor, to determine the position error compensation signal of the rotor.

In the above solution, the operation of determining, according to the position error compensation signal and the position signal of the rotor, the ideal phase interval of the rotor includes the following operations.

The position error compensation signal is compensated to the position signal of the rotor that has not been corrected, to obtain an ideal position signal of the rotor.

The ideal phase interval of the rotor is determined according to a corresponding relationship between a preset phase interval and the position signal of the rotor.

In the above solution, the operation of determining, according to the ideal phase interval of the rotor, the adjustment scheme for the rotor of the electric motor includes the following operations.

A control voltage required for adjusting the rotor is determined.

The adjustment scheme for the rotor of the electric motor is determined based on the control voltage and the ideal phase interval of the rotor.

In the above solution, the operation of determining the control voltage required for adjusting the rotor includes the following operations.

A current angular velocity and a given angular velocity of the rotor that has not been corrected in the electric motor are obtained; here the given angular velocity is a desired angular velocity.

The control voltage required for adjusting the rotor is determined by using a regulator to process a difference between the current angular velocity and the given angular velocity.

Embodiments of the disclosure further provide an apparatus for compensating a commutation error of an electric motor, which includes a collection unit, a filtering unit, a determination unit and a commutation unit.

The collection unit is configured to collect a position signal and a three-phase current signal of a rotor that has not been corrected in an electric motor, when the rotor rotates in a set direction; here the position signal of the rotor represents a rotation angle of the rotor.

The filtering unit is configured to carry out filtering processing on the three-phase current signal to obtain a fundamental component of the three-phase current signal, and determine, based on the fundamental component of the three-phase current signal, a position error compensation signal of the electric motor.

The determination unit is configured to determine, according to the position error compensation signal and the position signal of the rotor, an ideal phase interval of the rotor.

The commutation unit is configured to determine, according to the ideal phase interval of the rotor, an adjustment scheme for the rotor of the electric motor, and commutate, according to the adjustment scheme, the rotor of the electric motor.

Embodiments of the disclosure further provide an apparatus for compensating a commutation error of an electric motor, which includes a processor, and a memory configured to store computer programs executable on the processor.

The processor is configured to perform operations of any one of the above methods when executing the computer programs.

Embodiments of the disclosure further provide a storage medium having stored therein computer programs that, when executed by a processor, causes the processor to implement operations of any one of the above methods.

According to the method and apparatus for compensating a commutation error of the electric motor, and the storage medium provided by the embodiments of the disclosure, filtering processing is carried out on the collected three-phase current signal to extract a fundamental component corresponding to each phase current signal of the three-phase current signal; a position error compensation signal of the electric motor is determined based on the obtained fundamental component; and since a harmonic in the current signal are removed by filtering processing, signal offset does not occur in the obtained fundamental component. Based on this, an ideal commutation phase of the rotor is determined in combination with the position error compensation signal and the actually collected position signal, so as to implement commutation of the rotor of the electric motor in a corresponding adjustment scheme. In this way, commutation of the BLDC at the optimal commutation point is achieved without introducing the signal offset, and drive performance of the BLDC is ensured.

BRIEF DESCRIPTION OF THE DRAWINGS

FIG. 5 is a schematic diagram of a corresponding relationship among a preset sector, a position signal and a drive scheme of a rotor.

DETAILED DESCRIPTION

In order to make the objective, technical solutions and advantages of embodiments of the disclosure clearer, specific technical solutions of the disclosure are further described in detail below in conjunction with the accompanying drawings of the embodiments of the disclosure. The following embodiments are intended to explain the disclosure, but are not intended to limit the scope of the disclosure.

Figure 1A:
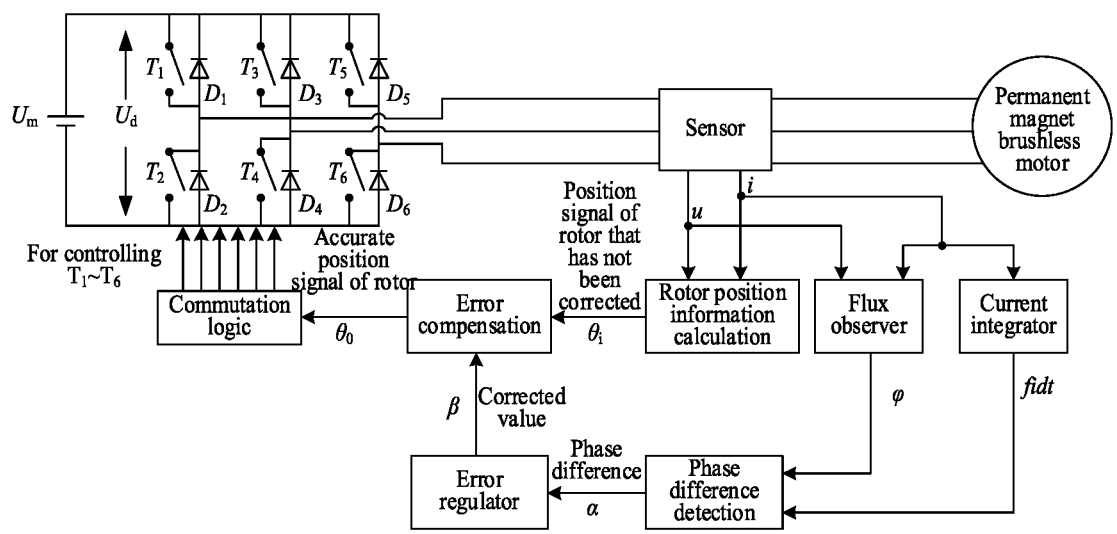
FIG. 1A is a schematic diagram of implementation of a method for determining a commutation error in a related art.

A method for determining a commutation error is proposed in a related art. FIG. 1A is a schematic diagram of implementation of a method for determining a commutation error in a related art. As shown in FIG. 1A, current and voltage signals of an electric motor are collected through a sensor, then a commutation error compensation signal is obtained from a phase difference between a flux signal $\Psi$ obtained by a flux observer and a current integral signal fidt obtained by a current integral module. Here, in the method of determining the commutation error, it is proposed that a phase difference between a back electromotive force signal and a current signal in the electric motor may be replaced by the phase difference between the flux signal $\Psi$ and the current integral signal fidt.

Figure 1B:
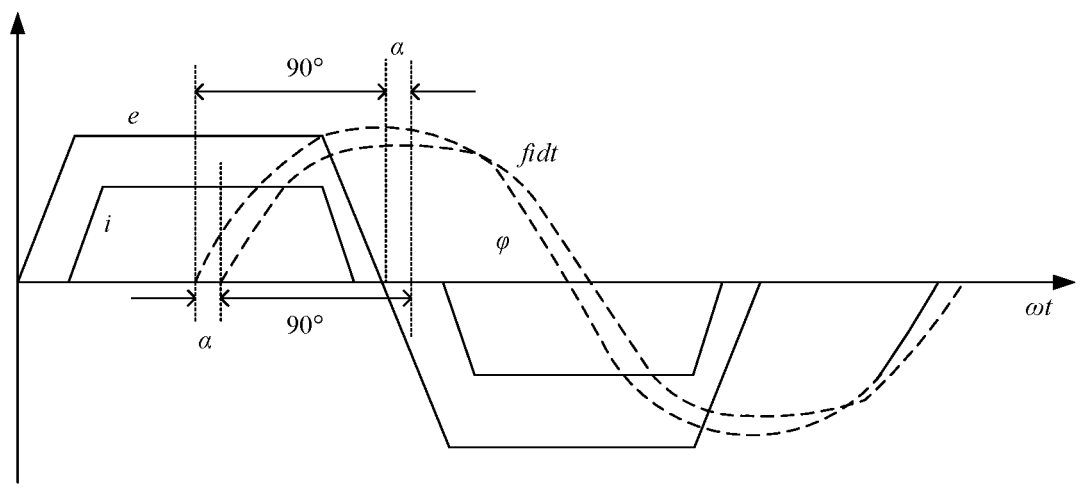
FIG. 1B is a schematic diagram of a relationship between a back electromotive force signal e and a current signal i, and a relationship between a flux signal $\Psi$ and a current integral signal fidt in a method for determining a commutation error in a related art.

FIG. 1B is a schematic diagram of a relationship between a back electromotive force signal e and a current signal i, and a relationship between a flux signal $\Psi$ and a current integral signal fidt in a method for determining a commutation error in a related art; as shown in FIG. 1B, the flux signal $\Psi$ lags the back electromotive force signal e by 90 degree, while the current integral signal fidt lags the current signal i by 90 degree; in this way, the phase difference between the back electromotive force signal and the current signal in the electric motor may be replaced by the phase difference between the flux signal Ψ and the current integral signal ∫idt; and the phase difference a between the flux signal Ψ and the current integral signal ∫idt is determined by a phase difference detection module, and then the phase difference is adjusted to 0, to obtain the commutation error compensation signal.

However, such commutation error compensation scheme is based on the premise that resistance and inductance information of the flux observer of an electric motor is accurate, and the current integrator does not have an offset error. However, in practice, resistance and inductance parameters of the high-speed electric motor are relatively small, it is easy to cause actual resistance and inductance parameters to be different from their corresponding theoretical values in practical manufacturing process due to modular manufacturing, asymmetry in the number of turns, different line contacting resistances, therefore the resistance and inductance of the flux observer model are inaccurate. In addition, the current signal will generate a direct current offset component after it is processed by an integral module, the offset will introduce an error in a zero-crossing point of the current integral signal, affecting detection of the phase difference.

Figure 2:
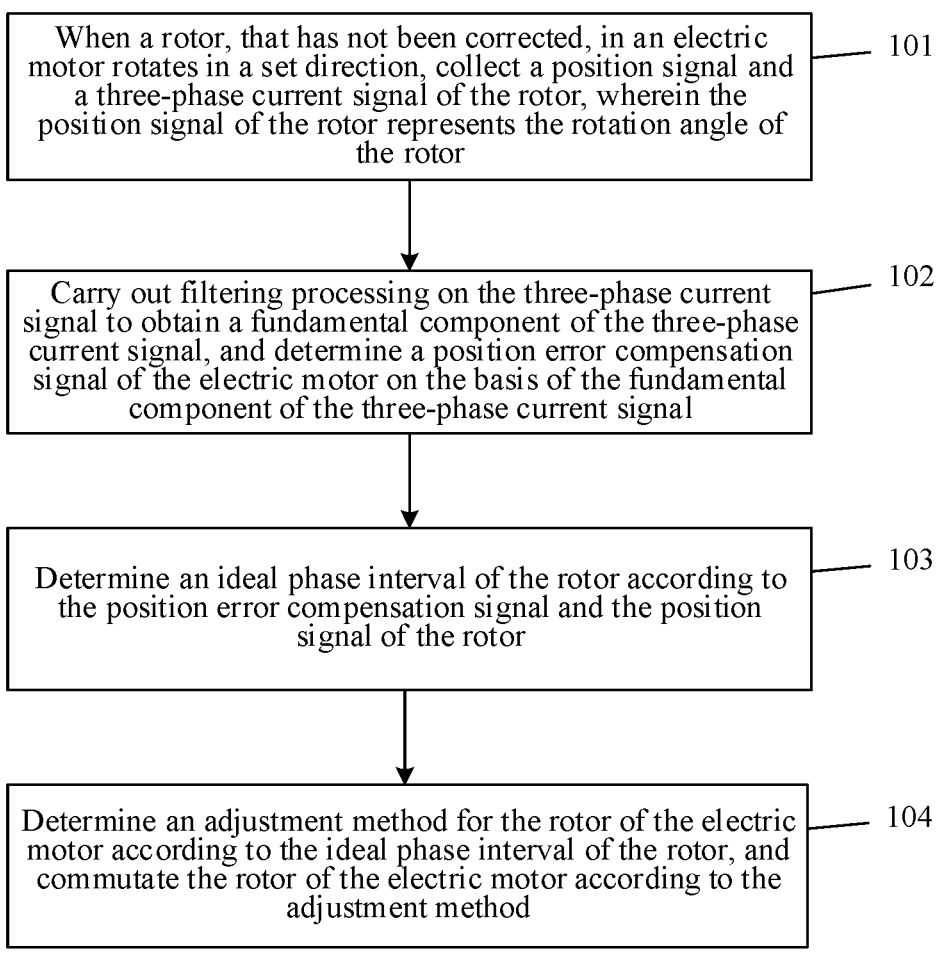
FIG. 2 is a method for compensating a commutation error of an electric motor provided by some embodiments of the disclosure.

Based on this, in order to compensate the commutation error, an embodiment of the disclosure provides a method for compensating a commutation error of an electric motor, which, as shown in FIG. 2, includes the following operations.

In operation 101, a position signal and a three-phase current signal of a rotor that has not been corrected in an electric motor are collected when the rotor rotates in a set direction; here the position signal of the rotor represents a rotation angle of the rotor.

In some embodiments of the disclosure, the electric motor is a BLDC; the set direction may be a clockwise direction or a counterclockwise direction. The commutation of the BLDC refers to commutation of the rotor in the BLDC. The position signal of the rotor refers to the rotation angle of the rotor, for example, when the rotor rotates 60 degree, the position signal of the rotor is 60 degree.

In a practical application, the position signal of the rotor in the BLDC is from 0 degree to 360 degree, and every 60 degree is classified as a sector, and there are six sectors in total. Sector I is from 30 degree to 90 degree, sector II is from 90 degree to 150 degree, sector III is from 150 degree to 210 degree, sector IV is from 210 degree to 270 degree, sector V is from 270 degree to 330 degree, and sector VI is from 330 degree to 30 degree. A rotation of the rotor in the BLDC from the sector I to the sector II or from the sector III to the sector IV means that commutation occurs once.

In a practical application, the position signal of the rotor in the BLDC in the operation 101 may be obtained by a sensorless technique, or may be directly read by a rotor position sensor (Hall sensor, photoelectric encoder, etc.) in the BLDC.

It should be noted that compared with the manner of reading the rotor position sensor, the sensorless technique that obtains the position signal of the rotor in the BLDC does not need to be additionally equipped with a sensor and thus reduces hardware cost. However, the scheme for collecting the position signal of the rotor realized by using the rotor position sensor is simple to implement and easy to operate. Embodiments of the disclosure do not limit the scheme for collecting the position signal of the rotor, and a corresponding scheme may be selected according to actual needs.

The three-phase current signal in the operation 101 may be obtained by a sampling resistor; the sampling resistor may realize sampling for current and voltage; sampling for current may be realized by connecting a resistor with a small resistance in series, while sampling for voltage may be realized by connecting to a resistor with a big resistance in parallel. In this way, the collection of a three-phase current and a three-phase voltage may be achieved by setting corresponding resistors.

In operation 102, filtering processing is carried out on the three-phase current signal to obtain a fundamental component of the three-phase current signal, and a position error compensation signal of the electric motor is determined based on the fundamental component of the three-phase current signal.

For the drive scheme of the BLDC, the three-phase current signal is not a sine wave but a square wave containing a large number of harmonics. Based on this, it is necessary to filter out the harmonics in the three-phase current signal. In some embodiments of the disclosure, a neural network filter is constructed to filter the harmonics in the three-phase current signal, and the fundamental component corresponding to the three-phase current signal is obtained without signal offset.

Here the operation of carrying out filtering processing on the three-phase current signal to obtain the fundamental component of the three-phase current signal includes the following operations.

An angular velocity of the rotor that has not been corrected in the electric motor is obtained.

A cosine reference signal and a sine reference signal are determined according to the angular velocity.

An initial current output signal is determined based on the cosine reference signal and the sine reference signal.

A weighting signal is generated based on a difference between the three-phase current signal and the initial current output signal.

The fundamental component of the three-phase current signal is obtained according to the weighting signal, the cosine reference signal and the sine reference signal.

It should be noted that in some embodiments of the disclosure, filtering processing is carried out on the three-phase current signal through the neural network filter to obtain the fundamental component of the three-phase current signal. Since a fundamental function may be determined by an amplitude, an angular velocity and an initial phase, that is, $a_1 \cos(w_i t) + a_2 \sin(w_i t)$, the formula represents a value of a fundamental signal at point i. In this way, the fundamental function may be constructed through the cosine reference signal and the sine reference signal, and then the fundamental component corresponding to the three-phase current signal may be obtained through an adaptive weighting coefficient.

Here the filtering processing of the three-phase current signal will be illustrated with reference to FIG. 3.

Figure 3:
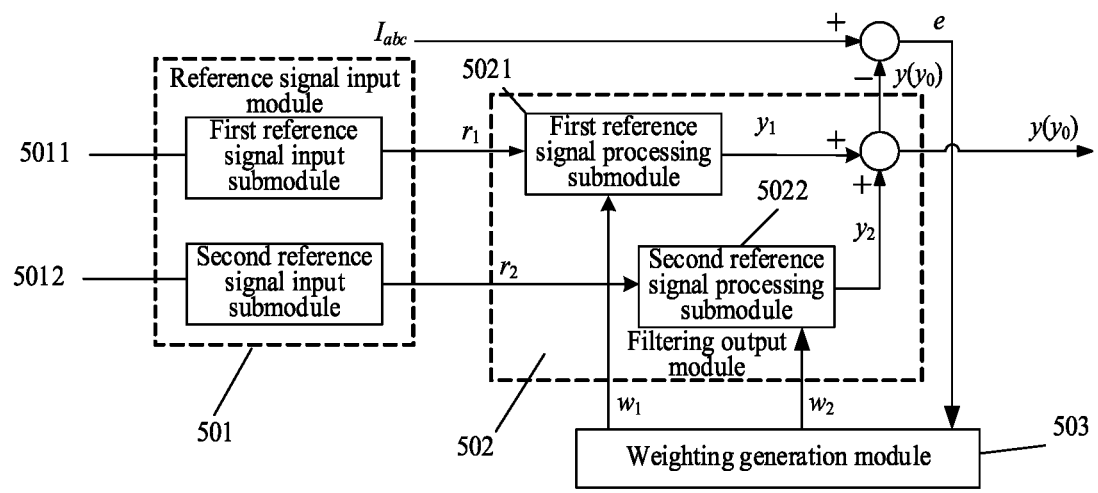
FIG. 3 is a schematic diagram of a principle of a neural network filter provided by some embodiments of the disclosure.

FIG. 3 is a schematic diagram of a principle of a neural network filter provided by some embodiments of the disclosure. As shown in FIG. 3, the neural network filter includes a reference signal input module 501, a filtering output module 502 and a weighting generation module 503. The reference signal input module 501 includes a first reference signal input submodule 5011 and a second reference signal input submodule 5012; the filtering output module 502 includes a first reference signal processing submodule 5021 and a second reference signal processing submodule 5022.

Both input signals of the first reference signal input submodule 5011 and the second reference signal input submodule 5012 are related to rotation speed of the BLDC; the first reference signal input submodule 5011 may be expressed as $r_1=\cos(w_e nT_s)$; the second reference signal input submodule 5012 may be expressed as $r_1=\cos(w_e nT_s)$; $w_e$ is an angular velocity of rotation of the electric motor, $T_s$ is a sampling step size, n is the number of sampling, $r_1$ is the cosine reference signal, $r_2$ is the sine reference signal.

Input signals of the first reference signal processing submodule 5021 are the cosine reference signal $r_1$ and a weighting signal $w_1$; an output signal thereof is $y_1$; here $$y_1 = r_1 \times w_1.$$

Input signals of the second reference signal processing submodule 5022 are the sine reference signal $r_2$ and a weighting signal $w_2$; an output signal thereof is $y_2$; here $$y_2 = r_2 \times w_2.$$

The cosine reference signal $r_1$, the sine reference signal $r_2$, and corresponding weighting signals $w_1$, $w_2$ are used as input signals of the filtering output module 502 and input into the filtering output module 502, and an initial current output signal $y_0$ is output, that is, $$y_0 = y_1 + y_2 = r_1 \times w_1 + r_2 \times w_2.$$

As shown in FIG. 3, the weighting signals $w_1$ and $w_2$ are generated by the weighting generation module 503; the weighting generation module 503 adaptively generates the weighting signals $w_1$ and $w_2$ according to a difference e between the input signal $I_{abc}$ and the output signal y from the filtering output module 502. The adjustment process may be expressed as:

$$w^n = w^{n-1} + \eta e^n r^n;$$

Where η is an adaptive learning factor of the neural network filter, $w^{n-1}$ is the weighting signal when the number of sampling is n−1, $w^n$ is the weighting signal when the number of sampling is n, and $e^n$ is a difference between the input signal $I_{abc}$ and the output signal y from the filtering output module 502 when the number of sampling is n, here $e^n$ may be expressed as:

$$e^n = I_{abc}^n - y_0^n = I_{abc}^n - (r_1^n w_1^n + r_2^n w_2^n).$$

In a practical application, when the input signal $I_{abc}$ is subjected to filtering processing by the neural network filter, the filtering processing is carried out separately, and currents of the three phases do not affect each other, that is, an A-phase current $I_a$ is subjected to filtering processing by the neural network filter to obtain a corresponding fundamental current signal $I_{a\_1}$; a B-phase current $I_b$ is subjected to filtering processing by the neural network filter to obtain a corresponding fundamental current signal $I_{b\_1}$; a C-phase current $I_b$ is subjected to filtering processing by the neural network filter to obtain a corresponding fundamental current signal $I_{c\_1}$.

Since a fundamental amplitude of the current signal is extracted through the neural network filter, influence brought by signal offset may be greatly reduced, so that there is no error occurred in a fundamental phase of the extracted current signal, which provide a foundation for accurate determination of a subsequent compensation signal.

In some embodiments of the disclosure, after the fundamental components $I_{a\_1}$, $I_{b\_1}$ and $I_{c\_1}$ of the three-phase current signal are obtained, the fundamental components $I_{a\_1}$, $I_{b\_1}$ and $I_{c\_1}$ of the three-phase current signal of the BLDC are subjected to vector decomposition to become an excitation current component $I_d$ (a d-axis current component $I_d$) and a torque current component $I_q$ (a q-axis current component $I_q$); the excitation current $I_d$ mainly generates excitation, which controls intensity of a magnetic field in the BLDC, and the q-axis current $I_q$ is used to control torque of the BLDC; then when the excitation current $I_d$ is 0, all the currents of the BLDC are used to generate electromagnetic torque since the BLDC does not have armature response of the d-axis, that is, the d-axis does not contribute the torque; therefore, in an ideal state, the d-axis current $I_d$ of the electric motor is 0. In the high-speed BLDC, due to existence of factors such as reactance of winding, the d-axis current $I_d$ is not 0 in practical operation, and then when the d-axis current is adjusted to 0, the position error compensation signal may be determined. Here $\theta_{adv}$ is used to denote the position error compensation signal.

In this way, the operation of determining, based on the fundamental component of the three-phase current signal, the position error compensation signal of the electric motor in the operation 102 includes the following operations.

In operation b1, the fundamental component of the three-phase current signal on a stationary coordinate system is converted into a two-phase current signal on a rotational coordinate system; here a rotation angle of the rotational coordinate system is the same as the rotation angle of the rotor of the electric motor, the two-phase current signal includes a d-axis current corresponding to one axis in the rotational coordinate system.

In operation b2, the d-axis current is adjusted according to a corresponding relationship between the d-axis current and the position signal of the rotor, to determine the position error compensation signal of the rotor.

Here, in the operation b1, conversion of the fundamental component of the three-phase current signal on the stationary coordinate system into the two-phase current signal on the rotational coordinate system may be implemented by performing Clark conversion and then performing Park conversion. The Clark conversion is used to convert the three-phase current signal on the stationary coordinate system into the two-phase current signal on the stationary coordinate system, that is, a three-phase stator coordinate system (three axes are arranged by spacing apart 120 degree, $I_a$, $I_b$, $I_c$) is converted into a two-phase stator rectangular coordinate system (two axes are arranged by spacing apart 90 degree, $I_\alpha$, $I_\beta$). The Park conversion is used to convert the two-phase current signal on the stationary coordinate system into the two-phase current signal on the rotational coordinate system, that is, the two-phase stator rectangular coordinate system (two axes are arranged by spacing apart 90 degree, $I_\alpha$, $I_\beta$) is converted into a two-phase rotor rectangular coordinate system (two axes are arranged by spacing apart 90 degree, $I_d$, $I_q$).

The two-phase current signal on the rotational coordinate system includes the d-axis current corresponding to one axis in the rotational coordinate system, and a q-axis current corresponding to the other axis in the rotational coordinate system.

It should be noted that projection of current vectors on the stationary three-axis coordinate system a, b, c onto α axis and β axis of a stationary two-axis coordinate system may be carried out by the following formula:

$$\begin{bmatrix} I_\alpha \\ I_\beta \end{bmatrix} = k \times \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} I_a \\ I_b \\ I_c \end{bmatrix}.$$

In the formula, $I_\alpha$ is current of the α axis of the stationary two-axis coordinate system α, β; $I_\beta$ is current of the β axis of the stationary two-axis coordinate system α, β; $I_a$ is current of an upper a axis in the stationary three-axis coordinate system a, b, c; $I_b$ is current of an upper b axis in the stationary three-axis coordinate system a, b, c; and $I_c$ is current of an upper c axis in the stationary three-axis coordinate system a, b, c; k is a ratio of the effective number of turns of each phase of the three-phase winding to the effective number of turns of each phase of the two-phase winding, and when the total power before and after conversion is unchanged, $k=\sqrt{2/3}$.

Projection of a voltage vector on the stationary two-axis coordinate system α, β onto a d-axis and a q-axis of a rotational two-axis coordinate system may be performed by the following formula:

$$\begin{bmatrix} I_d \\ I_q \end{bmatrix} = \begin{bmatrix} \cos\varphi & \sin\varphi \\ -\sin\varphi & \cos\varphi \end{bmatrix} \begin{bmatrix} I_\alpha \\ I_\beta \end{bmatrix}.$$

Here φ an angle between the d-axis and the α-axis, specifically referring to the rotation angle of the rotor, $I_d$ is current of the d-axis, and $I_q$ is current of the q-axis. In this way, $I_d$ and $I_q$ may be determined by the position signal of the rotor and $I_\alpha$ and $I_\beta$ collected in the operation 101.

Figure 4:
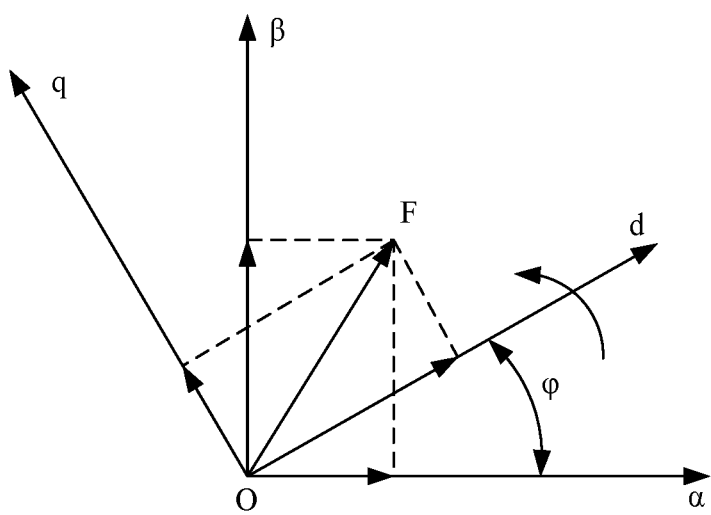
FIG. 4 is a schematic diagram of projecting a voltage vector on a stationary two-axis coordinate system $\alpha$, $\beta$ onto a d-axis and a q-axis of a rotational two-axis coordinate system.

FIG. 4 is a schematic diagram of projecting a voltage vector on a stationary two-axis coordinate system α, β onto a d-axis and a q-axis of a rotational two-axis coordinate system. As shown in FIG. 4, $\overline{OF}$ is a synthesized current vector for $I_d$, $I_q$. φ is an angle between the d-axis and the α-axis, which refers to the rotation angle of the voltage vector on the stationary two-axis coordinate system α, β projected to the d-axis and q-axis of the rotating two-axis coordinate system.

After the excitation current component $I_d$ and the torque current component $I_q$ are obtained, the corresponding relationship between the d-axis current and the position signal of the rotor may be adjusted by a regulator to determine the position error compensation signal of the rotor.

Since Clark conversion and then Park conversion are performed on the three-phase current signal, two current components $I_d$ and $I_q$ on the rotational coordinate system are obtained, and in an ideal state, $I_d$=0, thus $I_d$ is adjusted to 0 by the regulator, a corresponding position error compensation signal is output. Here the regulator may be a proportional regulator, and a difference between the actual value $I_d$ and the given value 0 is input to the proportional regulator through a set proportionality coefficient, and a corresponding error compensation signal is output. The proportionality coefficient is the ratio of angle to current. In this way, the position error compensation signal $\theta_{adv}$ may be obtained.

In operation 103, an ideal phase interval of the rotor is determined according to the position error compensation signal and the position signal of the rotor.

Here the ideal phase interval refers to an ideal corresponding sector. The position signal of the rotor is an actual position signal of the rotor collected in the operation 101, or a position signal that has not been corrected, and is represented by θ.

As mentioned above, the angle corresponding to one revolution by which the rotor of the BLDC rotates is divided into 6 sectors. Sector I is from 30 degree to 90 degree, sector II is from 90 degree to 150 degree, sector III is from 150 degree to 210 degree, sector IV is from 210 degree to 270 degree, sector V is from 270 degree to 330 degree, and sector VI is from 330 degree to 30 degree. Thus, after the position signal θ of the rotor is compensated, the ideal position signal $\theta_0$ of the rotor may be obtained, and the ideal position signal $\theta_0$ of the rotor has a corresponding relationship with a sector; in this way, an ideal corresponding sector of the rotor may be determined; for example, assuming that the position signal of the rotor is 120 degree, then it corresponds to sector II.

Here the operation of determining, according to the position error compensation signal $\theta_{adv}$ and the position signal θ of the rotor, the ideal phase interval of the rotor includes the following operations. The position error compensation signal $\theta_{adv}$ is compensated to the position signal θ of the rotor that has not been corrected, to obtain an ideal position signal $\theta_0$ of the rotor. The ideal phase interval of the rotor is determined according to a corresponding relationship between a preset phase interval and the position signal of the rotor.

It should be noted that after the position error compensation signal $\theta_{adv}$ is obtained, the ideal position signal $\theta_0$ may be determined by adding the position error compensation signal $\theta_{adv}$ and the position signal θ of the rotor.

The corresponding relationship between the preset sector and the position signal of the rotor refers to a corresponding relationship between the sector and the position signal of the rotor under an ideal condition. In a practical application, after the position signal of the rotor is determined, a corresponding sector may be obtained by finding in a mapping table preset in a program, or it may be obtained by another manner, which is not limited here.

FIG. 5 is a schematic diagram of a corresponding relationship between a preset sector and a position signal of a rotor. As shown in FIG. 5, in some application embodiments of the disclosure, the position of the rotor in the BLDC is from 0 degree to 360 degree, every 60 degree is classified as a sector; and the driver outputs the corresponding drive scheme in each sector. In the drive scheme shown in FIGS. 5, A, B, and C represent A-phase, B-phase and C-phase of the BLDC respectively; + and − represent an upper switching device and a lower switching device of each of the phases respectively.

In operation 104, an adjustment scheme for the rotor of the electric motor is determined according to the ideal phase interval of the rotor, and the rotor of the electric motor is commutated according to the adjustment scheme.

It should be noted that the operation of determining, according to the ideal corresponding sector of the rotor, the adjustment scheme for the rotor of the electric motor includes the following operations. A control voltage required for adjusting the rotor is determined. The adjustment scheme for the rotor of the electric motor is determined based on the control voltage and the ideal phase interval of the rotor.

Here the control voltage is used to control each of switching devices in a three-phase full-bridge circuit to determine operating state of each of the switching devices, and implement the commutation of the BLDC at an ideal position by controlling the operating state of each of the switching devices. The three-phase full-bridge circuit includes six switching devices S1 to S6. In a practical application, six switching devices S1 to S6 in the three-phase full-bridge circuit correspond to different PWM drive signals respectively, that is, three-phase six-state PWM drive signals. The PWM drive signal of each of the switching devices may control the operating state of the corresponding switching device. In this way, commutation of the rotor may be implemented by controlling the corresponding switching device through the drive signal.

Figure 6:
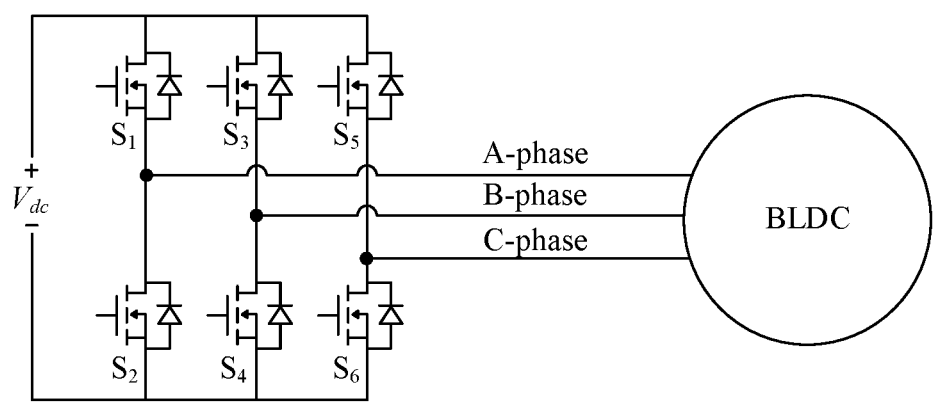
FIG. 6 is a schematic diagram of a control relationship between a control voltage and switching devices in a three-phase full-bridge circuit.

The control relationship between the control voltage and each of the switching devices in the three-phase full-bridge circuit may be shown in FIG. 6, there are three states of each of the switching devices in FIG. 6: a PWM state, an all-on state and an off state; here the three states directly reflect the operating voltage acting on each of the switching devices. For example, assuming that the rotor in the BLDC is at the position of 40 degree, and the drive scheme A+B− corresponding to the position of 40 degree where the rotor in the BLDC is located is found from FIG. 5; that is, the upper switching device S1 of A-phase and the lower switching device S4 of B-phase in FIG. 6 is to be turned on at this time, and the remaining four devices S2, S3, S5, S6 are turned off, to obtain the operating voltage of each of the switching devices in the three-phase full-bridge circuit.

It should be noted that a duty cycle of the PWM drive signal may be determined by obtaining the control voltage, since the duty cycle of the PWM drive signal directly reflects the amplitude of the PWM drive signal, it may be used to control a manner in which the switching devices in the three-phase full-bridge circuit operate. Thus, the adjustment scheme for the rotor of the electric motor is determined based on the duty cycle of the PWM drive signal determined by the control voltage and the ideal corresponding sector of the rotor.

It should be noted that the operation of determining the control voltage required for adjusting the rotor includes the following operations.

A current angular velocity and a given angular velocity of the rotor that has not been corrected in the electric motor are obtained; here the given angular velocity is a desired angular velocity.

The control voltage required for adjusting the rotor is determined by using a regulator to process a difference between the current angular velocity and the given angular velocity.

Here, since a relationship between the angular velocity and the position signal of the rotor is $\theta=\omega_t$, the angular velocity $\omega$ of the rotor may be obtained by differentiating the position signal $\theta$. In this way, the current angular velocity $\omega$ may be obtained by differentiating the collected current position signal $\theta$; the given angular velocity is the desired angular velocity. The current angular velocity $\omega$ refers to the actual angular velocity obtained by differentiating the collected position signal $\theta$.

The regulator that processes the difference between the current angular velocity and the given angular velocity may be a rotation speed regulator; the rotation speed regulator is a regulator for adjusting rotation speed. In a specific implementation, the control voltage is obtained by making the difference between the collected angular velocity and the given angular velocity used as an input value and input into the rotation speed regulator.

After the control voltage is determined, the duty cycle of PWM may be controlled according to the control voltage to generate the corresponding control signal, and the operating states of the switching devices in the three-phase full bridge are controlled by the control signal to drive the BLDC.

The disclosure will be described in detail below in conjunction with specific application examples.

Figure 7:
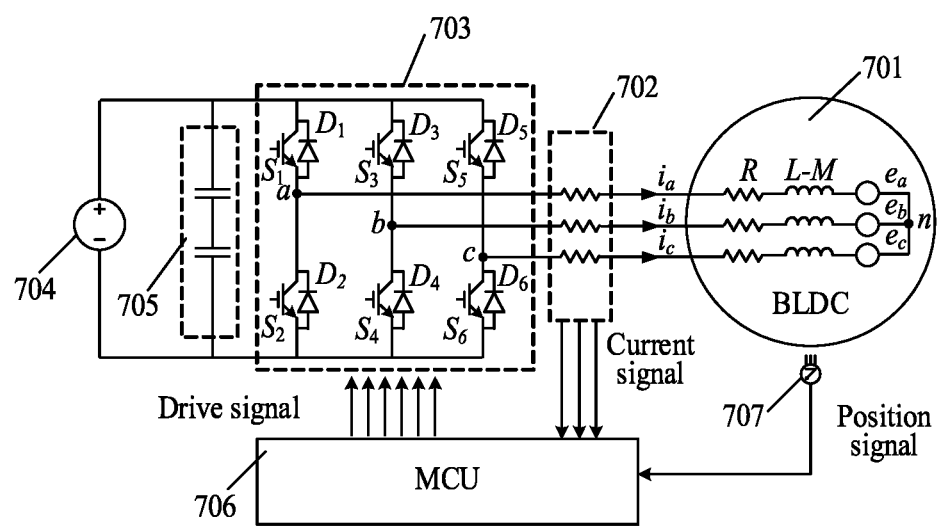
FIG. 7 is a schematic structural diagram of a hardware system of a BLDC applied into an electronic device of some embodiments of the disclosure.

In some application embodiments, the BLDC has six sectors, and it is implemented by using a hardware system as shown in FIG. 7. As shown in FIG. 7, the hardware system includes: a BLDC 701, a three-phase terminal current sampling resistor 702, a three-phase full-bridge 703, a battery 704, a capacitor 705, a Micro Controller Unit (MCU) 706, and a position sensor 707; S1 to S6 are control switches. The MCU 706 controls the three-phase full-bridge 703 through the drive signal to control the BLDC 701; the MCU 706 collects the position signal through the position sensor 707; the MCU 706 collects the current signal through the three-phase terminal current sampling resistor 702. Three phases of the BLDC 701 are connected to three sets of current sampling resistors respectively, namely the three-phase terminal current sampling resistor 702.

Figure 8:
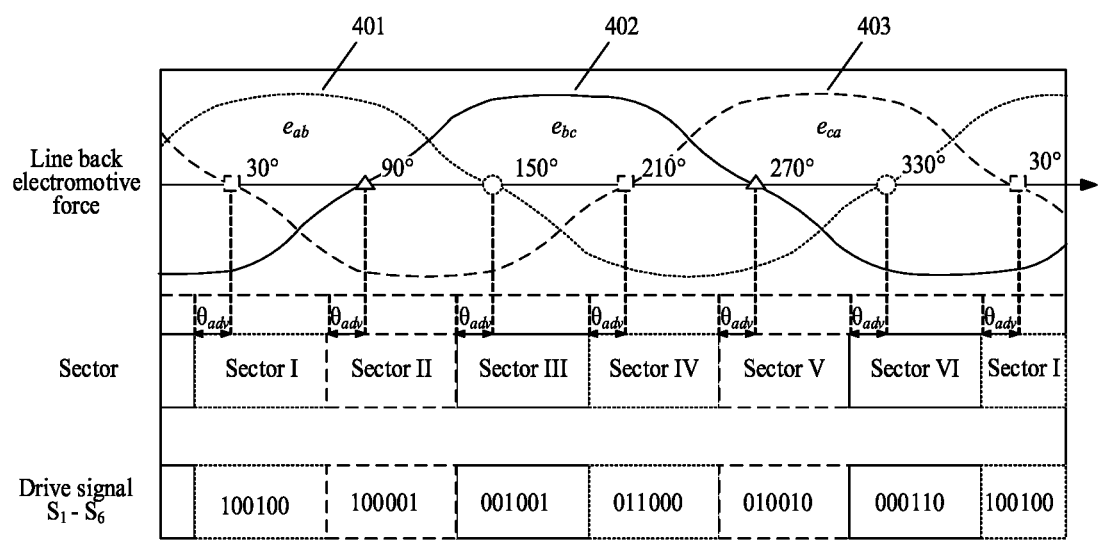
FIG. 8 is a schematic diagram of a corresponding relationship among a BLDC line back electromotive force waveform, a sector and a drive signal.

FIG. 8 is a schematic diagram of a corresponding relationship among a BLDC line back electromotive force waveform, a sector and a drive signal; in FIG. 8, waveforms 401, 402 and 403 are back electromotive force waveforms of lines AB, BC and CA of the BLDC respectively, the phase difference between any two of the back electromotive force phases of the three lines is 120 degree, an electromagnetic period of a BLDC body includes 6 sectors, their numbers are sector I, sector II, sector III, sector IV, sector V and sector VI respectively, boundary of a sector is an angular position of commutation of the BLDC, and in an ideal state, the angular interval between any two of the sectors is 60 degree.

In some embodiments of the disclosure, the position error compensation signal $\theta_{adv}$ is obtained through the provided method for compensating a commutation error, and the ideal position signal $\theta_0$ obtained by adding the position compensation signal $\theta_{adv}$ to the collected position signal $\theta$, thereby implementing commutation of the BLDC.

Figure 9:
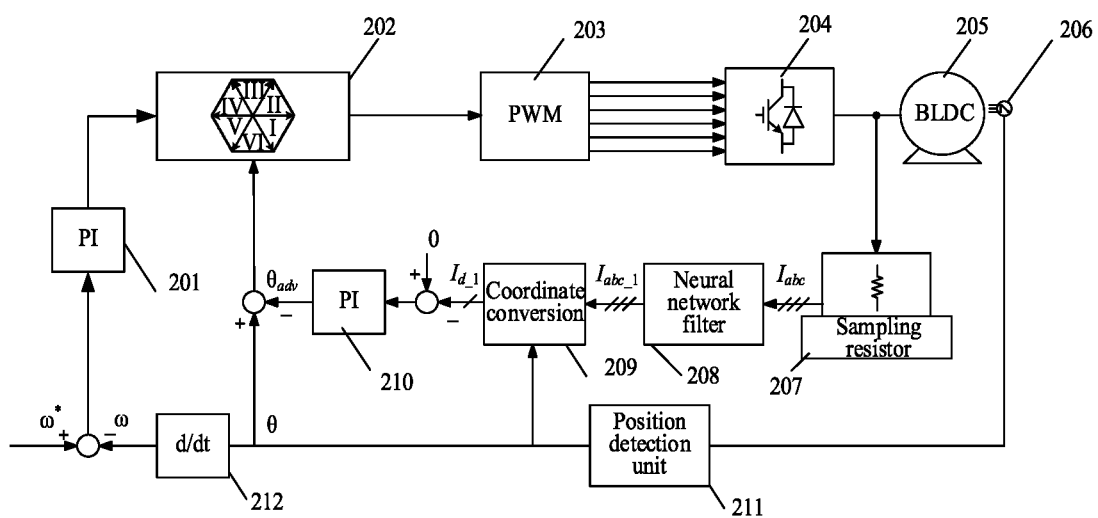
FIG. 9 is a schematic diagram of implementation of a method for compensating a commutation error of an electric motor provided by some embodiments of the disclosure.

FIG. 9 is a schematic diagram of implementation of a method for compensating a commutation error of an electric motor provided by some embodiments of the disclosure; as shown in FIG. 9, the three-phase current signal of the BLDC 205 is collected through the sampling resistor 207 to obtain $I_{abc}$ ($I_a$, $I_b$, $I_c$); filtering processing is carried out on the three-phase current signal $I_{abc}$ through the neural network filter 208 to obtain corresponding fundamental components $I_{a\_1}$, $I_{b\_1}$ and $I_{c\_1}$, the fundamental components $I_{a\_1}$, $I_{b\_1}$ and $I_{c\_1}$ of the three-phase current signal of the BLDC are subjected to vector decomposition through coordinate conversion 209 to become an excitation current component $I_d$ (a d-axis current component $I_d$); considering that the d-axis current $I_d$ of the electric motor is 0 in an ideal state, the position error compensation signal $\theta_{adv}$ is obtained by adjusting $I_d$ to 0 by the regulator 210. The position error compensation signal $\theta_{adv}$ and the collected position signal $\theta$ are added to obtain an ideal position signal $\theta_0$.

On the other hand, the position signal $\theta$ of the BLDC is collected by a sensor 206 and a position detection unit 211, and the position signal $\theta$ is processed by a differentiation module 212 to obtain a current angular velocity $\omega$. After a given angular velocity $\omega^*$ is obtained, a difference between the current angular velocity $\omega$ and the given angular velocity $\omega^*$ is input to the rotation speed regulator 201 for adjustment, and accordingly, the control voltage is obtained. In this way, a logic table 202 for commutation is determined by the control voltage and the ideal position signal $\theta_0$, and the logic table for commutation refers to a corresponding relationship among the drive signal for commutation, the phase and the sector; finally, the PWM module 203 controls operating states of the switches in the three-phase full-bridge circuit 204 to drive the commutation of the BLDC.

According to the method and apparatus for compensating a commutation error of the electric motor, and the storage medium provided by the embodiments of the disclosure, filtering processing is carried out on the collected three-phase current signal to extract a fundamental component corresponding to each phase current signal of the three-phase current signal; a position error compensation signal of the electric motor is determined based on the obtained fundamental component; and since a fundamental amplitude of the current signal is extracted through the neural network filter, influence brought by signal offset may be greatly reduced. Based on this, an ideal commutation phase of the rotor is determined in combination with the position error compensation signal and the actually collected position signal, so as to implement commutation of the rotor of the electric motor in a corresponding adjustment scheme. In this way, commutation of the BLDC at the ideal commutation point is achieved without introducing the signal offset, and drive performance of the BLDC is ensured.

Moreover, the solutions of the embodiments of the disclosure do not require improvements in hardware, and implement timely commutation for the BLDCM by software only, which does not increase the hardware cost, and is simple and convenient to implement.

Figure 10:
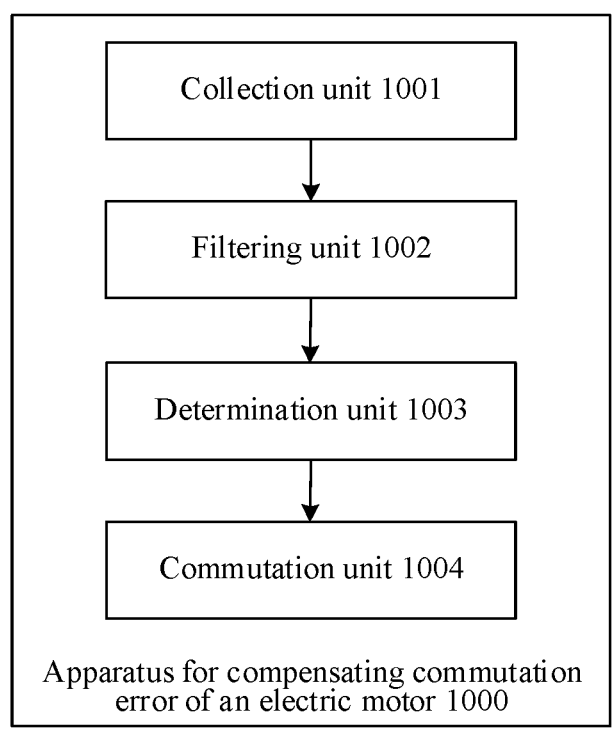
FIG. 10 is a schematic structural diagram of composition of an apparatus for compensating a commutation error of an electric motor provided by some embodiments of the disclosure.

In order to implement the method according to some embodiments of the disclosure, some embodiments of the disclosure further provide an apparatus for compensating a commutation error of an electric motor, and FIG. 10 is a schematic structural diagram of composition of an apparatus for compensating a commutation error of an electric motor provided by some embodiments of the disclosure. As shown in FIG. 10, the apparatus 1000 for compensating a commutation error of an electric motor includes a collection unit 1001, a filtering unit 1002, a determination unit 1003 and a commutation unit 1004.

The collection unit 1001 is configured to collect a position signal and a three-phase current signal of a rotor that has not been corrected in an electric motor, when the rotor rotates in a set direction; here the position signal of the rotor represents a rotation angle of the rotor.

The filtering unit 1002 is configured to carry out filtering processing on the three-phase current signal to obtain a fundamental component of the three-phase current signal, and determine, based on the fundamental component of the three-phase current signal, a position error compensation signal of the electric motor.

The determination unit 1003 is configured to determine, according to the position error compensation signal and the position signal of the rotor, an ideal phase interval of the rotor.

The commutation unit 1004 is configured to determine, according to the ideal phase interval of the rotor, an adjustment scheme for the rotor of the electric motor, and commutate, according to the adjustment scheme, the rotor of the electric motor.

In a practical application, the collection unit 1001, the filtering unit 1002, the determination unit 1003 and the commutation unit 1004 may be implemented by a processor in the apparatus for compensating a commutation error of the BLDC.

It should be noted that when performing the control of commutation for the BLDC, the apparatus for compensating a commutation error of the BLDC provided by the above embodiments only uses the division of the above-mentioned program modules as an illustrative example. In a practical application, the above process allocation may be completed by different program modules as needed, that is, the internal structure of the apparatus is divided into different program modules to complete all or part of the above-mentioned processes. Moreover, the embodiments of the apparatus for compensating a commutation error of an electric motor and of the method for compensating a commutation error of an electric motor provided in the above embodiments belong to the same concept, and the specific implementation thereof may refer to the method embodiments for the details, which will not be repeated here.

Figure 11:
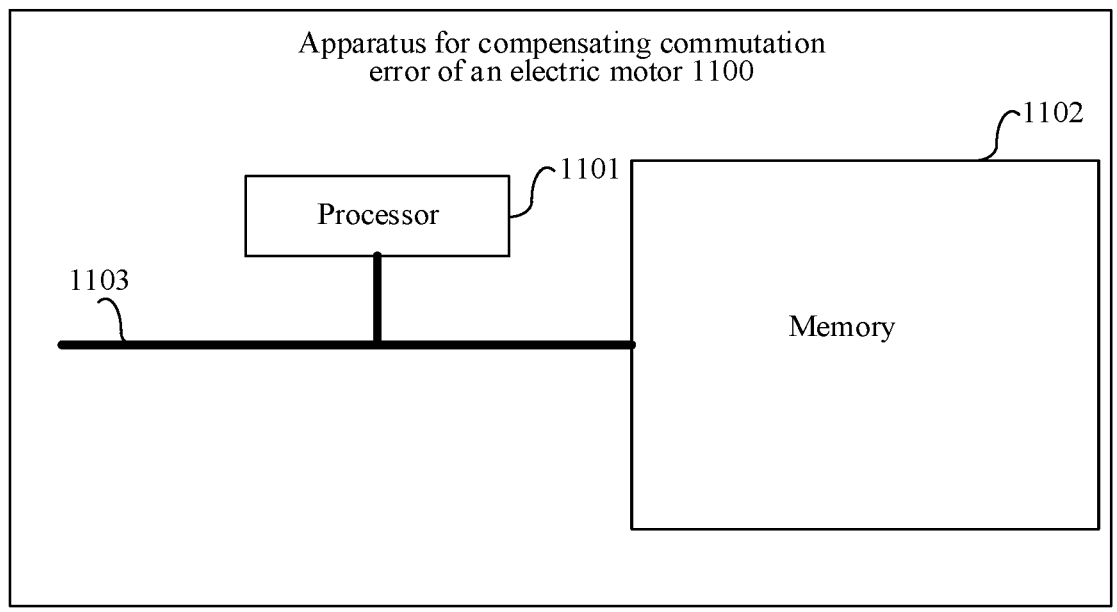
FIG. 11 is a schematic structural diagram of hardware composition of an apparatus for compensating a commutation error of an electric motor provided by some embodiments of the disclosure.

Based on the hardware implementation of the above-mentioned program modules, and in order to implement the method according to the embodiments of the disclosure, some embodiments of the disclosure further provide an apparatus for compensating a commutation error of an electric motor. As shown in FIG. 11, the apparatus 1100 includes a processor 1101, and a memory 1102 configured to store computer programs executable on the processor.

The processor 1101 is configured to execute the method provided by one or more of the above-mentioned technical solutions when executing the computer programs.

In a practical application, as shown in FIG. 11, the components of the apparatus 1100 are coupled together by a bus system 1103. It may be appreciated that the bus system 1103 is configured to implement connection and communication among these components. The bus system 1003 includes, in addition to data bus, power bus, control bus, and status signal bus. For clarity, however, various buses are labeled as the bus system 1103 in FIG. 11.

Some exemplary embodiments further provide a storage medium, which is a computer-readable storage medium, such as a memory including computer programs executable by the processor of the apparatus for compensating a commutation error of an electric motor, to perform operations described in the foregoing methods. The computer-readable storage medium may be Ferromagnetic Random Access Memory (FRAM), Read Only Memory (ROM), Programmable Read-Only Memory (PROM), Erasable Programmable Read-Only Memory (EPROM), Electrically Erasable Programmable Read-Only Memory (EEPROM), Flash Memory, magnetic surface memory, optical disk, or memory such as Compact Disc Read-Only Memory (CD-ROM), etc.

It should be noted that the terms "first", "second" or the like are used to distinguish among similar objects, rather than describing a specific order or sequence.

In addition, the technical solutions described in the embodiments of the disclosure may be combined arbitrarily without conflict.

The foregoing descriptions are merely illustrative of the preferred embodiments of the disclosure and are not intended to limit the protection scope of the disclosure.

What is claimed is:

1. A method for compensating a commutation error of an electric motor, comprising:
  collecting a position signal and a three-phase current signal of a rotor that has not been corrected in an electric motor, when the rotor rotates in a set direction; wherein the position signal of the rotor represents a rotation angle of the rotor;
  filtering processing the three-phase current signal to obtain a fundamental component of the three-phase current signal, and determining, based on the fundamental component of the three-phase current signal, a position error compensation signal of the electric motor;

determining, according to the position error compensation signal and the position signal of the rotor, an ideal phase interval of the rotor; and determining, according to the ideal phase interval of the rotor, an adjustment scheme for the rotor of the electric motor, and commutating, according to the adjustment scheme, the rotor of the electric motor.

2. The method of claim 1, wherein the carrying out filtering processing on the three-phase current signal to obtain the fundamental component of the three-phase current signal comprises:

obtaining an angular velocity of the rotor that has not been corrected in the electric motor;

determining, according to the angular velocity, a cosine reference signal and a sine reference signal;

determining, based on the cosine reference signal and the sine reference signal, an initial current output signal;

generating, based on a difference between the three-phase current signal and the initial current output signal, a weighting signal; and obtaining, according to the weighting signal, the cosine reference signal and the sine reference signal, the fundamental component of the three-phase current signal.

3. The method of claim 1, wherein the determining, based on the fundamental component of the three-phase current signal, the position error compensation signal of the electric motor comprises:

converting the fundamental component of the three-phase current signal on a stationary coordinate system into a two-phase current signal on a rotational coordinate system; wherein a rotation angle of the rotational coordinate system is equal to the rotation angle of the rotor of the electric motor, the two-phase current signal comprises a d-axis current corresponding to one axis in the rotational coordinate system; and adjusting, according to a corresponding relationship between the d-axis current and the position signal of the rotor, the d-axis current to determine the position error compensation signal of the rotor.

4. The method of claim 1, wherein the determining, according to the position error compensation signal and the position signal of the rotor, the ideal phase interval of the rotor comprises:

compensating the position error compensation signal to the position signal of the rotor that has not been corrected, to obtain an ideal position signal of the rotor; and determining, according to a corresponding relationship between a preset phase interval and the position signal of the rotor, the ideal phase interval of the rotor.

5. The method of claim 1, wherein the determining, according to the ideal phase interval of the rotor, the adjustment scheme for the rotor of the electric motor comprises:

determining a control voltage required for adjusting the rotor; and determining, based on the control voltage and the ideal phase interval of the rotor, the adjustment scheme for the rotor of the electric motor.

6. The method of claim 5, wherein the determining the control voltage required for adjusting the rotor comprises:

obtaining a current angular velocity and a given angular velocity of the rotor that has not been corrected in the electric motor; wherein the given angular velocity is a desired angular velocity; and determining, by using a regulator to process a difference between the current angular velocity and the given angular velocity, the control voltage required for adjusting the rotor.

7. An apparatus for compensating a commutation error of an electric motor, comprising: a processor, and a memory configured to store computer programs executable on the processor;

wherein the processor is configured to perform operations of the method of claim 1 when executing the computer programs.

8. A storage medium, having stored therein computer programs that, when executed by a processor, causes the processor to implement operations of the method of claim 1.

9. An apparatus for compensating a commutation error of an electric motor, comprising:

a collection unit;
a filtering unit;
a determination unit, and
a commutation unit, wherein:

the collection unit is configured to collect a position signal and a three-phase current signal of a rotor that has not been corrected in an electric motor, when the rotor rotates in a set direction; wherein the position signal of the rotor represents a rotation angle of the rotor;

the filtering unit is configured to filter process the three-phase current signal to obtain a fundamental component of the three-phase current signal, and determine, based on the fundamental component of the three-phase current signal, a position error compensation signal of the electric motor;

the determination unit is configured to determine, according to the position error compensation signal and the position signal of the rotor, an ideal phase interval of the rotor; and the commutation unit is configured to determine, according to the ideal phase interval of the rotor, an adjustment scheme for the rotor of the electric motor, and commutate, according to the adjustment scheme, the rotor of the electric motor.

* * * * *